(No Model.)

C. W. HUNT.
LUBRICATOR.

No. 529,125. Patented Nov. 13, 1894.

Witnesses
Chas. H. Smith
J. Stail

Inventor
Charles W. Hunt
per Lemuel W. Serrell

UNITED STATES PATENT OFFICE.

CHARLES W. HUNT, OF WEST NEW BRIGHTON, NEW YORK.

LUBRICATOR.

SPECIFICATION forming part of Letters Patent No. 529,125, dated November 13, 1894.

Application filed February 20, 1894. Serial No. 500,832. (No model.)

*To all whom it may concern:*

Be it known that I, CHARLES W. HUNT, a citizen of the United States, residing at West New Brighton, in the county of Richmond and State of New York, have invented an Improvement in Lubricators, of which the following is a specification.

Lubricators for machinery have been made with a cup internally screw-threaded and screwed upon a piston, and the opening through which the lubricant has passed has been through the stem of the piston, or else through the bottom of the cup, but with lubricators of this general character difficulty has been experienced in filling the cup with the lubricating material, especially where the same is in a liquid condition or may have become so by the action of heat, because in almost all of the lubricating devices of the character mentioned the cup containing the lubricating material has had to be inverted when applied to the piston.

My improvement relates to the combination in a lubricator, of a cup having a smooth interior surface and adapted to receive and contain lubricant, a cap screwed upon the upper end of the cup, a piston within the cup and a screw threaded stem to the piston passing off through the end of the cup opposite to the cap, whereby I am enabled to apply the lubricating device in almost any position, and the lubricant can be forced through the tubular stem of the piston or through a tubular projection on the cover, and in all cases the cup can be filled without requiring to be inverted; and by applying the screw-thread around the stem of the piston, I am enabled to make the interior of the cup plain and to apply a packing to the piston, so that risk of leakage of the lubricating material is entirely prevented.

Figure 1:
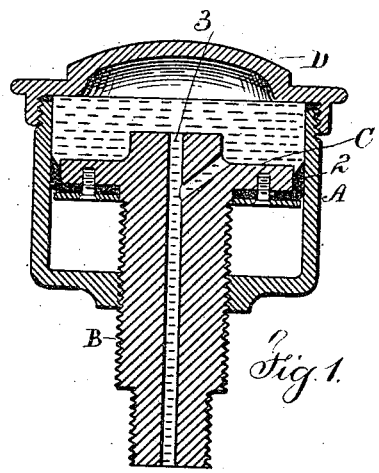
Figure 2:
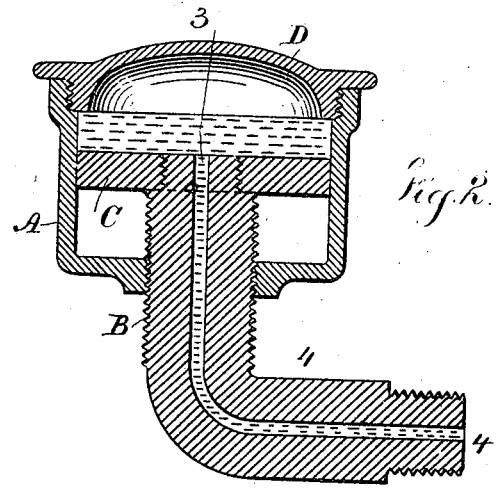
Figure 3:
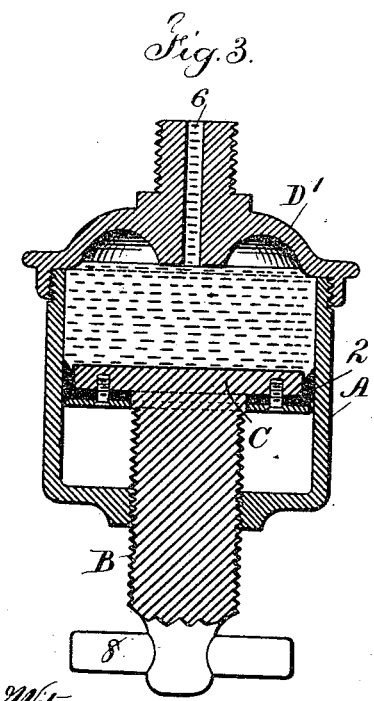
Figure 4:
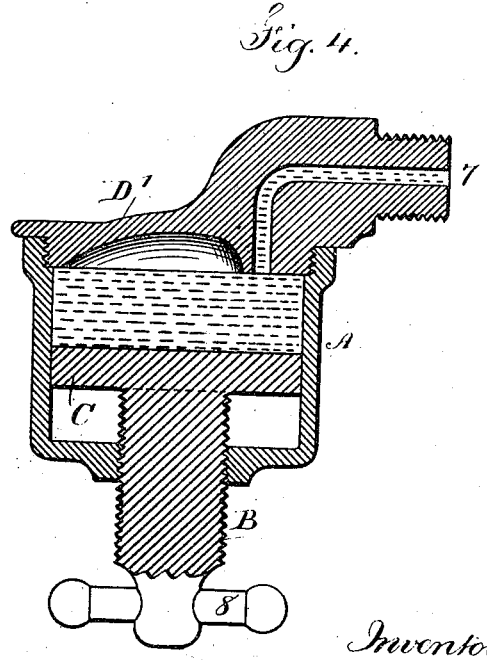

In the drawings, Figure 1 is a section of the lubricator with the supply tube passing down through the stem of the piston. Fig. 2 is a similar section with the stem and lubricant tube passing off horizontally. Fig. 3 is a vertical section of the lubricator with the supply tube passing upwardly through the cap. Fig. 4 is a similar view with the supply tube passing up through the cap and delivering horizontally.

The cup A is adapted to receive the screw-threaded stem B of the piston C, and it is provided with a screw cap D, and usually it is advantageous to provide a packing 2 to the piston C and to have the interior of the cup A smooth and cylindrical; and in all instances the stem of the piston passes out from the cup at the opposite end to the cap so that by separating the cap from the cup, the cup can always be filled with the lubricating material and does not require to be inverted when applied to use. These features are found in all the forms of my lubricator.

In Fig. 1 it will be observed that the hole or tube 3 for the lubricating material to pass away from the cup, extends downwardly through the stem B either straight, as shown in Fig. 1, or with a horizontal branch or arm 4, as seen in Fig. 2. In either instance the stem of the piston is to be secured in position where the lubricating material is to be supplied, and in order to fill the cup A with lubricating material it is only necessary to remove the cap B of the cup and screw the cup upwardly upon the stem B to the required extent for receiving the lubricating material, which material may be fluid or in the condition of a grease of more or less consistency, and when the cap is screwed upon the cup a force can be applied to eject the lubricating material through the hole 3 by the simple rotation of the cup upon the screw-threaded stem of the piston.

When this lubricator is to be applied so as to direct the lubricant upwardly, the cap D' is provided with a tubular delivery 6, as shown in Fig. 3, which may extend upwardly in the form of a straight tube or it may be bent off horizontally, as shown at 7, Fig. 4; and in either of these forms the cap is fastened to the place where the lubricating material is to be supplied, and the screw-threaded stem of the piston is rotated to apply pressure to the lubricating material, and in this form the screw-threaded stem B of the piston C is not tubular but it terminates with a handle or knob 8 or other device by which such stem can be rotated either in applying pressure to the lubricating material or in drawing the piston downwardly in the cup previous to the insertion of a fresh supply of lubricating material.

It will be observed that in the lubricator represented in Figs. 3 and 4, the cup A is to be unscrewed from the cap to receive its supply, and thereafter screwed upwardly to engage the rim of the fixed cap.

This improvement gives great facility for introducing the lubricating material into the cup and enables a piston to be used that is less liable to leak than the pistons that have heretofore been employed where the interior of the cup is screw-threaded.

It will be observed that the cap D is hollow to form an air space of greater or less size, and the lubricant closes the lower part of this space. Hence the air is confined and compressed to a greater or less extent by the screw stem and piston. Hence the air acts as a spring to discharge the lubricant upwardly or downwardly as required.

Usually it is advantageous to introduce a washer between the screw cap and the cup to prevent the lubricating material being forced out at such joint.

I claim as my invention—

1. The combination in a lubricator, of a cup 2, having a smooth interior surface and adapted to receive and contain lubricant, a removable cap screwed upon the upper end of the cup, a piston within the smooth cup, a stem to the piston passing off through the opposite end of the cup to the cap and screw-threaded upon its exterior surface, the hole in the end of the cup being correspondingly screw-threaded, and a passage for the discharge of the lubricant, substantially as set forth.

2. The combination in a lubricator, of a cylindrical cup with a smooth interior surface, a cap screwed upon the upper end of the cup, a piston and packing within the cylinder, a screw-threaded stem to the piston passing through a screw-threaded hole at the opposite end of the cup to the cap, and a passage for the discharge of the lubricant, substantially as set forth.

3. The combination in a lubricator, of a cylindrical cup 2, a piston within the cup, a stem to the piston screw-threaded on the exterior surface and passing through a screw-threaded hole at one end of the cup, a cap screwed upon the other end of the cup and having a hole passing off from the cap for the discharge of the lubricating material, substantially as set forth.

4. The combination in a lubricator, of a cylindrical cup 2, a piston and packing within the cup, a stem to the piston screw-threaded on the exterior surface and passing through a screw-threaded hole at one end of the cup, a cap screwed upon the other end of the cup and having a hole passing off from the cap for the discharge of the lubricating material, substantially as set forth.

5. The combination in a lubricator, of a cylindrical cup 2, a piston and packing within the cup, a stem, to the piston screw-threaded on the exterior surface and passing through a screw-threaded hole at one end of the cup, a cap screwed upon the other end of the cup and having a hole passing off from the cap for the discharge of the lubricating material, and a head by which the screw-threaded stem and piston are rotated, substantially as set forth.

6. The combination in a lubricator, of a cup, a piston therein and means for moving the piston in relation to the cup, a cap removable from the upper end of the cup and having an air space in its under side and adapted to be tightly secured to the upper end of the cup after the oil has been placed in the cup so that the air above the lubricant will be compressed in the cap by the action of the piston on the lubricant, substantially as specified.

Signed by me this 15th day of February, 1894.

CHARLES W. HUNT.

Witnesses:
DANIEL J. AUGUSTINE,
LEMUEL W. SERRELL.